(12) United States Patent
Hamada

(10) Patent No.: US 11,509,788 B2
(45) Date of Patent: Nov. 22, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Susumu Hamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/060,927

(22) Filed: Oct. 1, 2020

(65) Prior Publication Data

US 2021/0258443 A1 Aug. 19, 2021

(30) Foreign Application Priority Data

Feb. 17, 2020 (JP) .............................. JP2020-023961

(51) Int. Cl.
*H04N 1/00* (2006.01)
*H04N 1/44* (2006.01)
*G06F 8/61* (2018.01)

(52) U.S. Cl.
CPC ........... *H04N 1/00938* (2013.01); *G06F 8/61* (2013.01); *H04N 1/00477* (2013.01); *H04N 1/00962* (2013.01); *H04N 1/4433* (2013.01); *H04N 2201/0094* (2013.01)

(58) Field of Classification Search
None
See application file for complete search history.

(56) References Cited

U.S. PATENT DOCUMENTS

| 6,353,928 | B1 * | 3/2002 | Altberg | G06F 8/61 |
| | | | | 717/175 |
| 8,200,962 | B1 * | 6/2012 | Boodman | H04L 67/289 |
| | | | | 713/176 |
| 9,442,708 | B1 * | 9/2016 | Reeves | G06F 8/61 |
| 2007/0245347 | A1 * | 10/2007 | Oya | H04L 67/34 |
| | | | | 717/176 |
| 2007/0263083 | A1 * | 11/2007 | Tamai | G06F 8/60 |
| | | | | 348/14.08 |

(Continued)

FOREIGN PATENT DOCUMENTS

| CN | 103473232 | * 12/2013 | ............. G06F 17/30 |
| GB | 2513535 | * 11/2014 | ............. G06F 21/53 |

(Continued)

OTHER PUBLICATIONS

L. Catuogno, C. Galdi and G. Persiano, "Secure Dependency Enforcement in Package Management Systems," in IEEE Transactions on Dependable and Secure Computing, vol. 17, No. 2, pp. 377-390, Mar. 1-Apr. 2020, doi: 10.1109/TDSC.2017.2777991. (Year: 2020).*

(Continued)

*Primary Examiner* — Beniyam Menberu
(74) *Attorney, Agent, or Firm* — Oliff PLC

(57) ABSTRACT

An information processing apparatus includes a memory and a processor configured to allow software to be installed onto the information processing apparatus even if a requirement is determined to be unsatisfied and to provide presentation so as to indicate that the software that has been installed is unavailable. The requirement is defined to run after installation the software to be installed.

6 Claims, 9 Drawing Sheets

(56) References Cited

U.S. PATENT DOCUMENTS

| | | | | |
|---|---|---|---|---|
| 2008/0082976 | A1* | 4/2008 | Steinwagner | G06F 8/63 718/1 |
| 2008/0244057 | A1* | 10/2008 | Kojima | G06F 8/61 709/223 |
| 2010/0077475 | A1* | 3/2010 | Deschenes | G06F 8/62 726/21 |
| 2011/0286044 | A1* | 11/2011 | Yuki | G06F 21/10 358/1.15 |
| 2012/0317565 | A1* | 12/2012 | Carrara | G06F 21/54 717/178 |
| 2013/0055228 | A1* | 2/2013 | Song | G06F 8/654 717/168 |
| 2016/0034263 | A1* | 2/2016 | Homma | G06F 8/61 717/178 |
| 2016/0299749 | A1* | 10/2016 | Sharma | H04L 67/42 |
| 2017/0329690 | A1* | 11/2017 | Cudak | G06F 11/3452 |
| 2018/0364957 | A1* | 12/2018 | Sasaki | G06F 3/0488 |
| 2019/0104230 | A1* | 4/2019 | Asai | H04L 67/34 |
| 2019/0199877 | A1* | 6/2019 | Kato | H04N 1/00832 |

FOREIGN PATENT DOCUMENTS

| | | | | |
|---|---|---|---|---|
| JP | H11272384 | * | 10/1999 | G06F 3/00 |
| JP | 4344203 | B2 | 10/2009 | |
| JP | 4394740 | B2 | 1/2010 | |
| JP | 2019-070970 | A | 5/2019 | |

OTHER PUBLICATIONS

Anonymous Author, "Software Installation Wizard UI with background colors controlled by the installation status", Jan. 9, 2014, IP.com Prior Art Database, IP.com No. IPCOM000234075D, pp. 1-8 (Year: 2014).*

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-023961 filed Feb. 17, 2020.

BACKGROUND

(i) Technical Field

The present disclosure relates to an information processing apparatus and a non-transitory computer readable medium.

(ii) Related Art

Japanese Unexamined Patent Application Publication No. 2019-070970 discloses an information processing apparatus that manages a license period for an application licensed with an availability period. The application is installed and temporarily stored in a halt condition after the installation, and license period management starts at the time that the application starts to run when the usage of the application starts.

Japanese Patent No. 4344203 discloses an image forming apparatus that acquires, via communication, application information to be used to determine whether an application can be installed. Then, the image forming apparatus presents on an operation panel in a selectable manner only applications that can be installed.

Japanese Patent No. 4394740 discloses an image forming apparatus that allows installation of an application program to start if it is determined in an advance check that the application program can be installed. The advance check is performed before the installation of the application program to determine whether the application program can be installed.

SUMMARY

Aspects of non-limiting embodiments of the present disclosure relate to providing an information processing apparatus and a non-transitory computer readable medium storing a program that enable a user to install software, for which requirements for running are determined to be unsatisfied upon installation, without causing a confusing situation to the user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Information Processing Apparatus

According to an aspect of the present disclosure, there is provided an information processing apparatus including
a memory, and
a processor configured to
allow software to be installed onto the information processing apparatus even if a requirement is determined to be unsatisfied, the requirement being defined to run after installation the software to be installed, and
provide presentation so as to indicate that the software that has been installed is unavailable.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described in detail with reference to the drawings.

Figure 1:
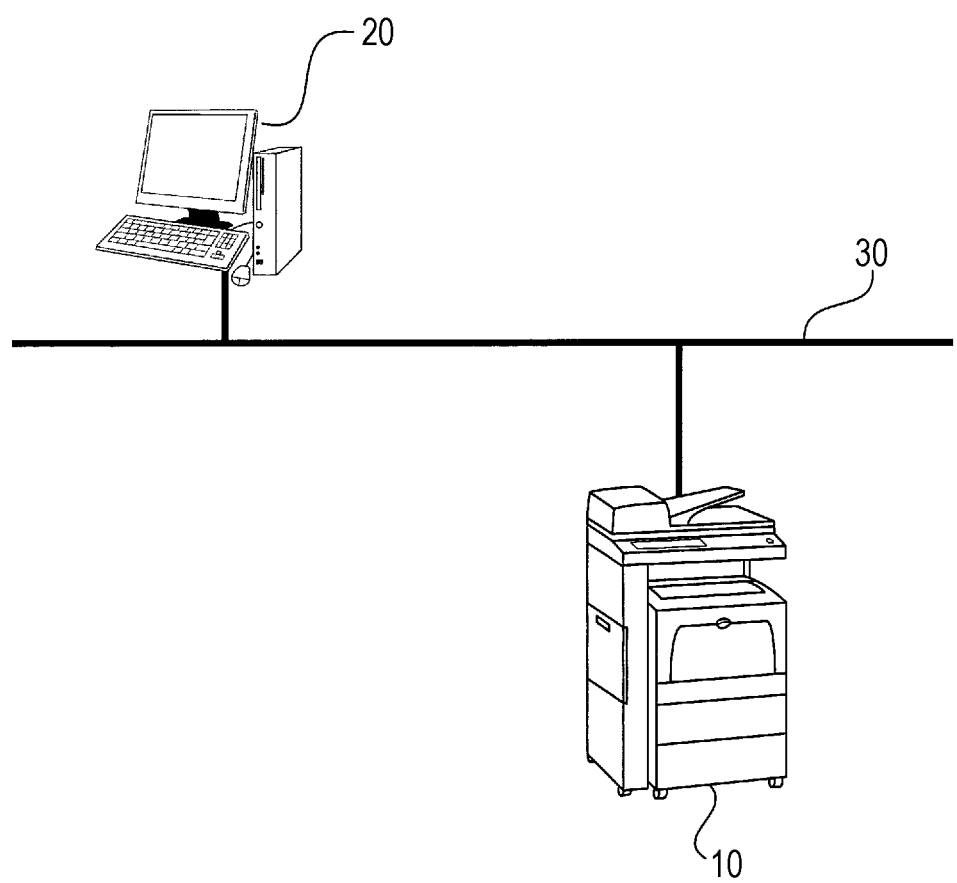
FIG. 1 is an illustration depicting a system configuration of an image forming system according to the exemplary embodiment of the present disclosure.

FIG. 1 is an illustration depicting a configuration of an image forming system according to the exemplary embodiment of the present disclosure.

As depicted in FIG. 1, the image forming system according to the exemplary embodiment of the present disclosure includes an image forming apparatus 10 and a terminal apparatus 20, which are connected to each other by using a network 30. The terminal apparatus 20 creates print data and transmits the created print data to the image forming apparatus 10 via the network 30. The image forming apparatus 10 accepts the print data transmitted from the terminal apparatus 20 and outputs an image based on the print data on a sheet of paper. The image forming apparatus 10 has a plurality of functions such as a print function, a scan function, a copying function, and a facsimile function and is a so-called multifunction peripheral.

The image forming apparatus 10 according to the present exemplary embodiment is configured so that software called an application program is installed and thereby various functions can be added.

However, when such an application program is installed onto the image forming apparatus 10, the application program does not necessarily run properly. Operating requirements defined for the application program to run properly need to be satisfied for the installed application program to run properly.

The operating requirements defined for the application program to run properly include various conditions, such as a condition that requires the image forming apparatus 10 to be equipped with a specific software or hardware resource and a condition that requires various settings of the image forming apparatus 10 to be set to settings required for the application program to run.

If at least one of all the operating requirements is not satisfied, the application program installed onto the image forming apparatus 10 is not properly operable. Thus, when the application program is installed onto the image forming apparatus 10, a program such as a check program provided in advance is used in some cases, and the application program is checked before installation to determine whether the application program is operable if installed.

In a case where it is determined as a result of such an advance check that at least one operating requirement for the application program to run properly is not satisfied, if the installation of the application program is canceled, the installation of an inoperable application program can be avoided.

However, even in such a case, if the operating requirements are satisfied at a later time, the application program is operable with no problem. Thus, when application programs are installed, it is sometimes inconvenient to block without exception the installation of an application program that is determined to be inoperable in the current situation.

For example, in a case where a customer engineer visits customer premises to install an application program onto the image forming apparatus 10 situated at a place such as an office of the customer, if the customer engineer tries to install the application program, finds that an option kit required to run the application program is not fitted yet, and is hindered from installing the application program, the customer engineer needs to visit the customer premises again and perform an installation process after the option kit has arrived and has been fitted.

However, if application programs that are inoperable if installed are allowed to be installed without limitation, a confusing situation, such as generation of an error caused by the inability of an application program to run properly, arises when a user launches the application program for use.

Thus, in the image forming apparatus 10 according to the present exemplary embodiment, such a configuration as is described below enables a user to install without causing a confusing situation to the user an application program for which at least one requirement for running is determined to be unsatisfied upon installation.

Figure 2:
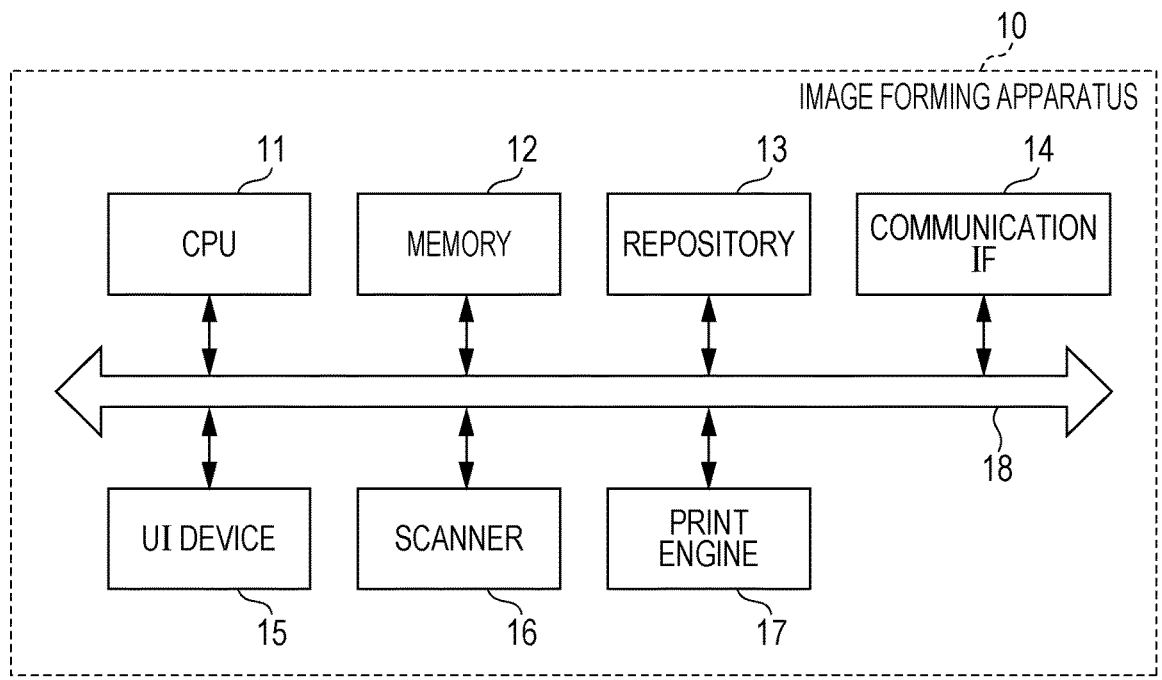
FIG. 2 is a block diagram depicting a hardware configuration of an image forming apparatus according to the exemplary embodiment of the present disclosure.

Next, FIG. 2 depicts a hardware configuration of the image forming apparatus 10 in the image forming system according to the present exemplary embodiment.

As depicted in FIG. 2, the image forming apparatus 10 includes a central processing unit (CPU) 11, a memory 12, a repository 13 such as a hard disk drive, a communication interface (abbreviated to IF) 14 that transmits and receives data to and from an external apparatus and the like via the network 30, a user-interface (abbreviated to UI) device 15 including a touch panel or a combination of a liquid crystal display and a keyboard, a scanner 16, and a print engine 17. These building units are connected to each other by using a control bus 18.

The print engine 17 prints an image on a recording medium such as a sheet of printing paper after performing processes such as charging, exposure, development, transfer, and fixing.

The CPU 11 is a processor that performs predetermined processing in accordance with a control program stored in the memory 12 or in the repository 13 and that controls operations of the image forming apparatus 10. Although the description in the present exemplary embodiment will be given assuming that the CPU 11 reads and executes the control program stored in the memory 12 or in the repository 13, it is also possible to provide the CPU 11 with a program stored in a storage medium such as a compact-disc read-only memory (CD-ROM).

Figure 3:
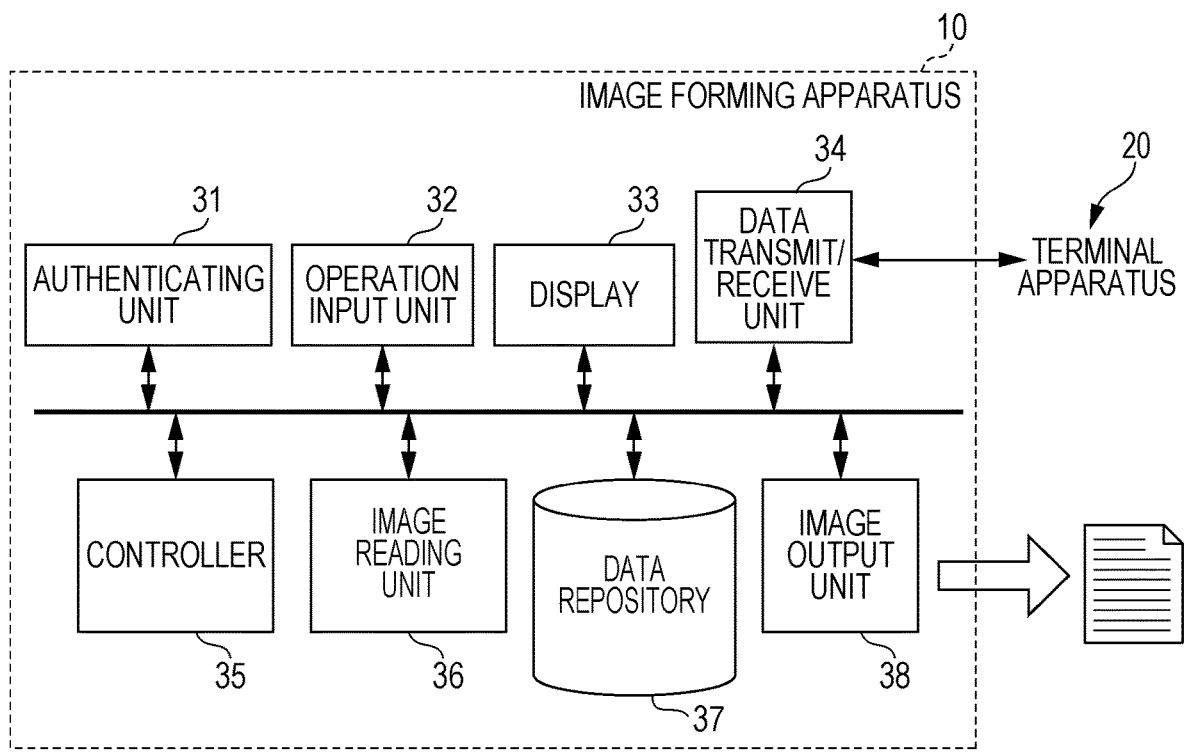
FIG. 3 is a block diagram depicting a functional configuration of the image forming apparatus according to the exemplary embodiment of the present disclosure.

FIG. 3 is a block diagram depicting a functional configuration of the image forming apparatus 10 realized by running the control program described above.

As depicted in FIG. 3, the image forming apparatus 10 according to the present exemplary embodiment includes an authenticating unit 31, an operation input unit 32, a display 33, a data transmit/receive unit 34, a controller 35, an image reading unit 36, a data repository 37, and an image output unit 38.

The authenticating unit 31 performs an authentication process for a user who is to use the image forming apparatus 10. Users who use the image forming apparatus 10 are divided into two types of users, which are a general user and a machine administrator. The machine administrator is, for example, a user selected for administering the image forming apparatus 10 in an organization that uses the image forming apparatus 10 and is empowered to perform a setting change that a general user is not allowed to perform and to use various functions that a general user is not allowed to use. The authenticating unit 31 determines whether a user who uses the image forming apparatus 10 is a machine administrator or a general user.

The data transmit/receive unit 34 transmits and receives data to and from an external apparatus such as the terminal apparatus 20.

The controller 35 creates print data in accordance with a print job received from the terminal apparatus 20 via the data transmit/receive unit 34 and controls the image output unit 38 to output created print data. The data repository 37 stores control information and various kinds of data including image data. The control information is related to various kinds of control performed by the controller 35.

The display 33 is controlled by the controller 35 and displays various kinds of information to a user. The operation input unit 32 receives information regarding various operations performed by the user.

The image output unit 38 outputs an image on a recording medium such as a sheet of printing paper in accordance with control by the controller 35. The image reading unit 36 reads a document image from a placed document in accordance with control by the controller 35.

When an application program is to be installed onto the image forming apparatus 10, a check is performed by using a check program that is created for examining whether the application program is properly operable if installed. Specifically, the controller 35 examines whether an application program is properly operable if installed by using a program such as a check program that is introduced from outside.

If it is determined that for an application program to be installed, at least one requirement for running the application program after installed is not satisfied, the controller 35 according to the present exemplary embodiment allows the application program to be installed onto the image forming apparatus 10. Then, the controller 35 provides presentation on the display 33 so as to indicate that the application program, which has been installed, is unavailable.

Specifically, the controller 35 provides presentation on the display 33 so as to conceal from a general user the fact that the application program has been installed. A general user is a user other than the machine administrator, who has administrator rights.

Then, the controller 35 provides presentation on the display 33 so as to reveal to the machine administrator that the application program has been installed but is in an inoperable condition.

At that time, the controller 35 may provide such presentation as reveals a software or hardware resource required for running the application program.

If the software or hardware resource of the image forming apparatus 10 is modified and the requirements for running the application program that has been installed are satisfied, the controller 35 provides presentation on the display 33 so as to indicate that the application program is available.

Further, if the software or hardware resource of the image forming apparatus 10 is modified and the requirements for running the application program that has been installed are satisfied, the controller 35 may report to a predetermined destination that the software or hardware resource of the image forming apparatus 10 is modified and the requirements for running the application program that has been installed are satisfied.

Next, an operation of the image forming apparatus 10 according to the present exemplary embodiment will be described in detail with reference to the drawings.

Figure 4:
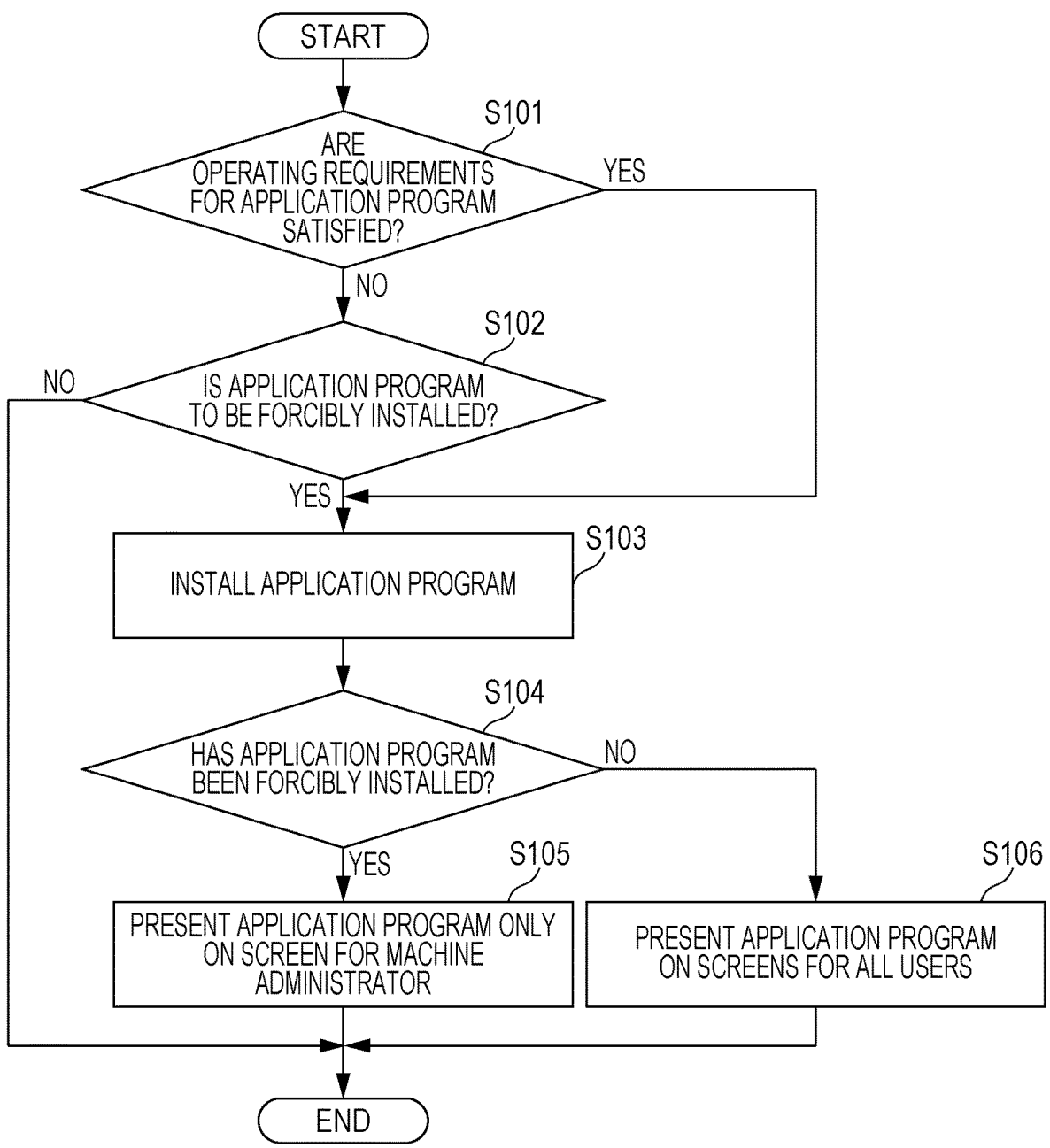
FIG. 4 is a flowchart for describing an operation in which whether an application program to be installed is operable is examined by using a check program and thereafter the application program is installed.

First, referring to the flowchart in FIG. 4, a description will be given of an operation to install an application program onto the image forming apparatus 10 according to the present exemplary embodiment. In the operation, such a check program as is described above is used for examining whether the application program to be installed is operable, and thereafter the application program is installed.

First, in step S101, in accordance with the type of the application program to be installed, the controller 35 checks whether operating requirements required for running the application program are satisfied.

Then, in step S102, the controller 35 determines whether the application program to be installed is operable on the image forming apparatus 10 in accordance with the check result obtained in step S101.

Figure 5:
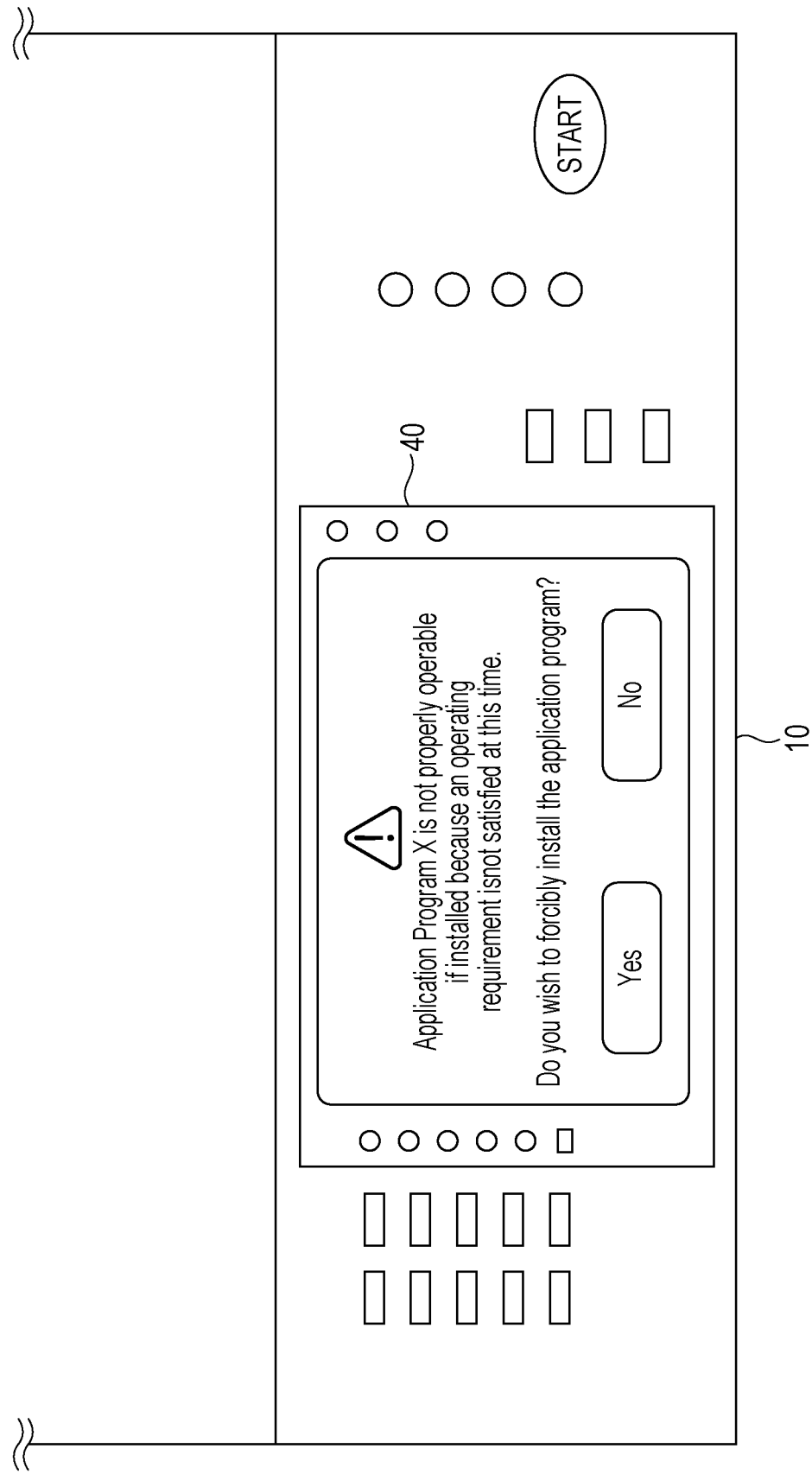
FIG. 5 is an illustration depicting an example of a display screen to ask a user whether to forcibly install an application program for which at least one operating requirement is not satisfied.

If it is determined in step S102 that the application program to be installed is inoperable on the image forming apparatus 10, the controller 35 presents in step S102 such a display screen as is depicted in FIG. 5 on an operation panel 40 and asks a user whether to forcibly install the application program.

If the user does not select forcible installation in step S102, the controller 35 finishes the process without installing the application program.

If the user selects forcible installation in step S102, the controller 35 allows the application program to be installed in step S103.

After the installation is finished, the controller 35 determines in step S104 whether the application program has been forcibly installed.

If it is determined in step S104 that the application program has been forcibly installed, the controller 35 presents an icon of the application program that has been installed only on a screen for the machine administrator in step S105. In other words, the controller 35 does not present the icon of the application program that has been installed on a screen for a general user.

Figure 6:
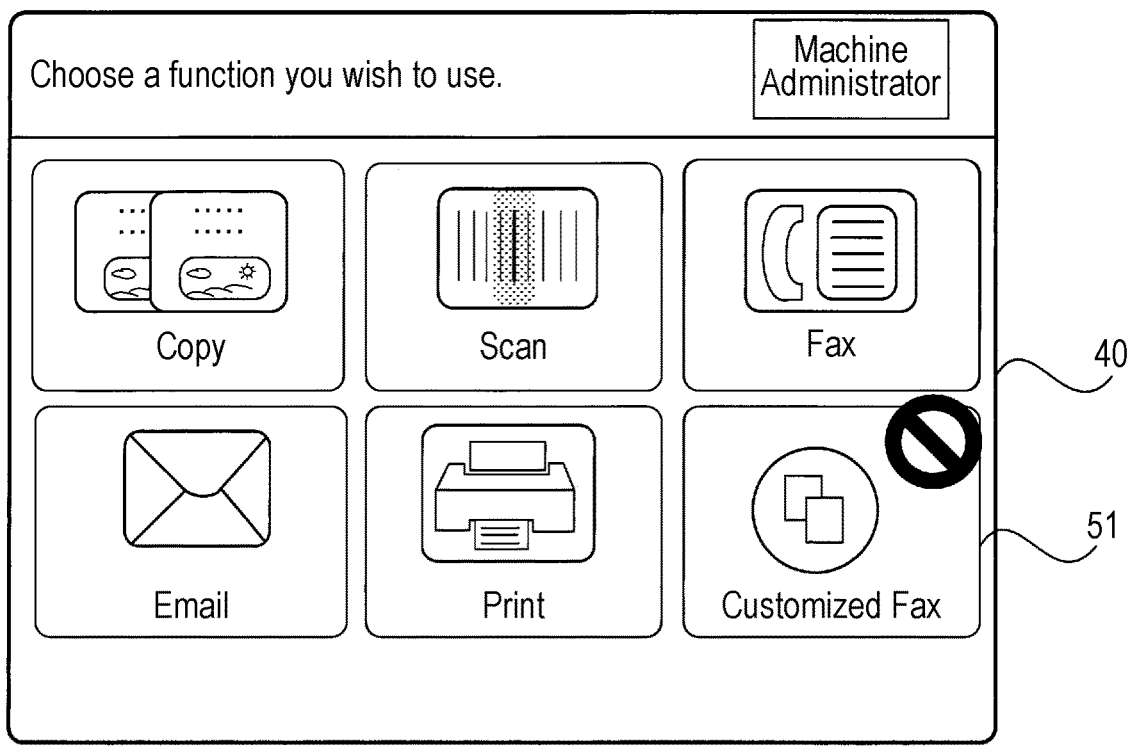
FIG. 6 is an illustration depicting an example of a home screen displayed on an operation panel in response to login by a machine administrator in a situation where an application program for which at least one operating requirement is not satisfied has been forcibly installed.
Figure 7:
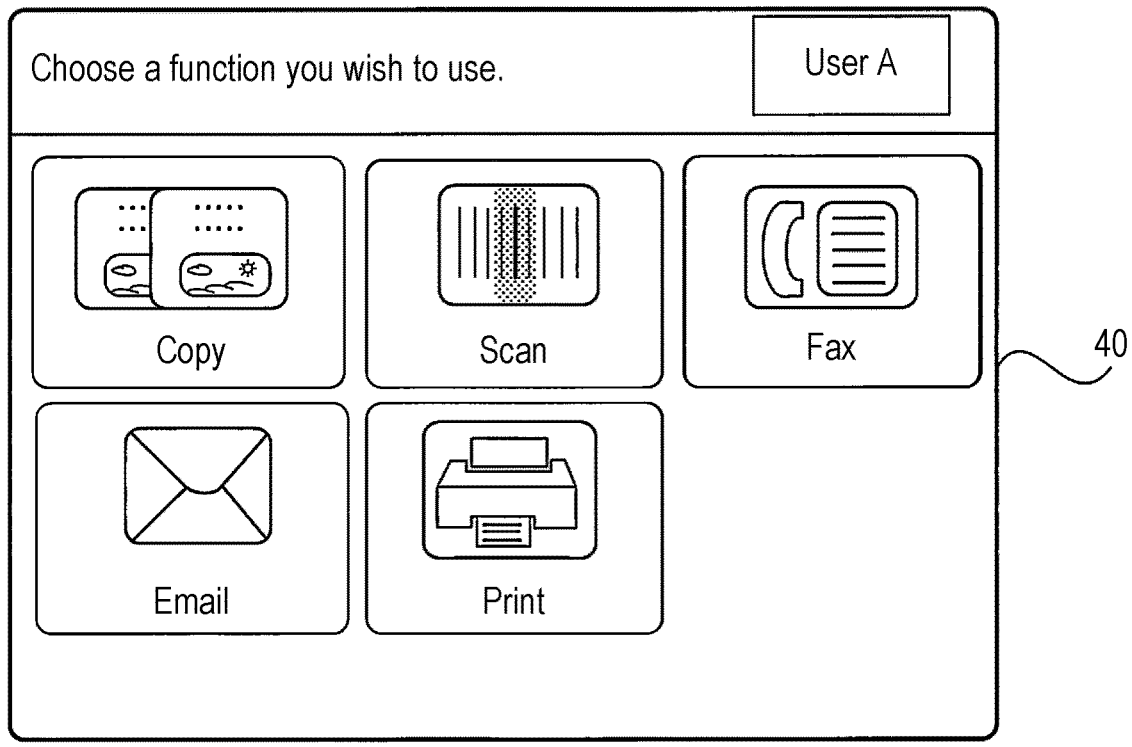
FIG. 7 is an illustration depicting an example of a home screen displayed on the operation panel in response to login by a general user in a situation where an application program for which at least one operating requirement is not satisfied has been forcibly installed.

FIGS. 6 and 7 depict examples of display screens presented in this way. In the following description, it is assumed that the application program to be installed is named "Customized Fax" and an operating requirement for the application program is that a Fax option kit is fitted. In the description, it is also assumed that the Fax option kit has not been fitted to the image forming apparatus 10 at the time that the application program is installed and is scheduled to be fitted at a later time.

FIG. 6 depicts an example of a home screen displayed on the operation panel 40 in response to login by the machine administrator in such a situation. Referring to FIG. 6 reveals that an icon 51 is presented on the home screen. The icon 51 is placed to launch the application program named "Customized Fax", which has been forcibly installed. However, since the icon 51 depicted in FIG. 6 is presented with a forbidden mark attached, the presentation reveals that selecting the icon 51 to launch the application program cannot properly run the application program.

Since the machine administrator is a user who administers the image forming apparatus 10, it is assumed that the machine administrator has grasped the fact that the Fax option kit has currently been ordered and will arrive at a later time, the fact that the application program named "Customized Fax" does not properly run without the Fax option kit, and other facts. Thus, presentation of the icon 51 on the home screen causes no confusing situation.

FIG. 7 depicts an example of a home screen displayed on the operation panel 40 in response to login by a user A, who is a general user, in such a situation. Referring to FIG. 7 reveals that no icon is presented anywhere on the home screen to launch the application program named "Customized Fax", which has been forcibly installed.

It is highly probable that a general user has not grasped the fact that the Fax option kit has currently been ordered and will arrive at a later time, the fact that the application program named "Customized Fax" does not properly run without the Fax option kit, and other facts. Thus, for example, even if such a symbol as the forbidden mark, which indicates that the application program does not properly run, is attached, the presentation of the icon 51 to launch the application program named "Customized Fax" as depicted in FIG. 6 may cause a confusing situation.

Accordingly, in the example of the display screen depicted in FIG. 7, no icon is intentionally presented anywhere on the home screen to launch the application program named "Customized Fax", which has been forcibly installed.

If it is determined in step S104 that the application program has been installed not in a forcible manner, the controller 35 presents in step S106 an icon of the application program that has been installed on each of the screens for all the users including the machine administrator and general users.

Figure 8:
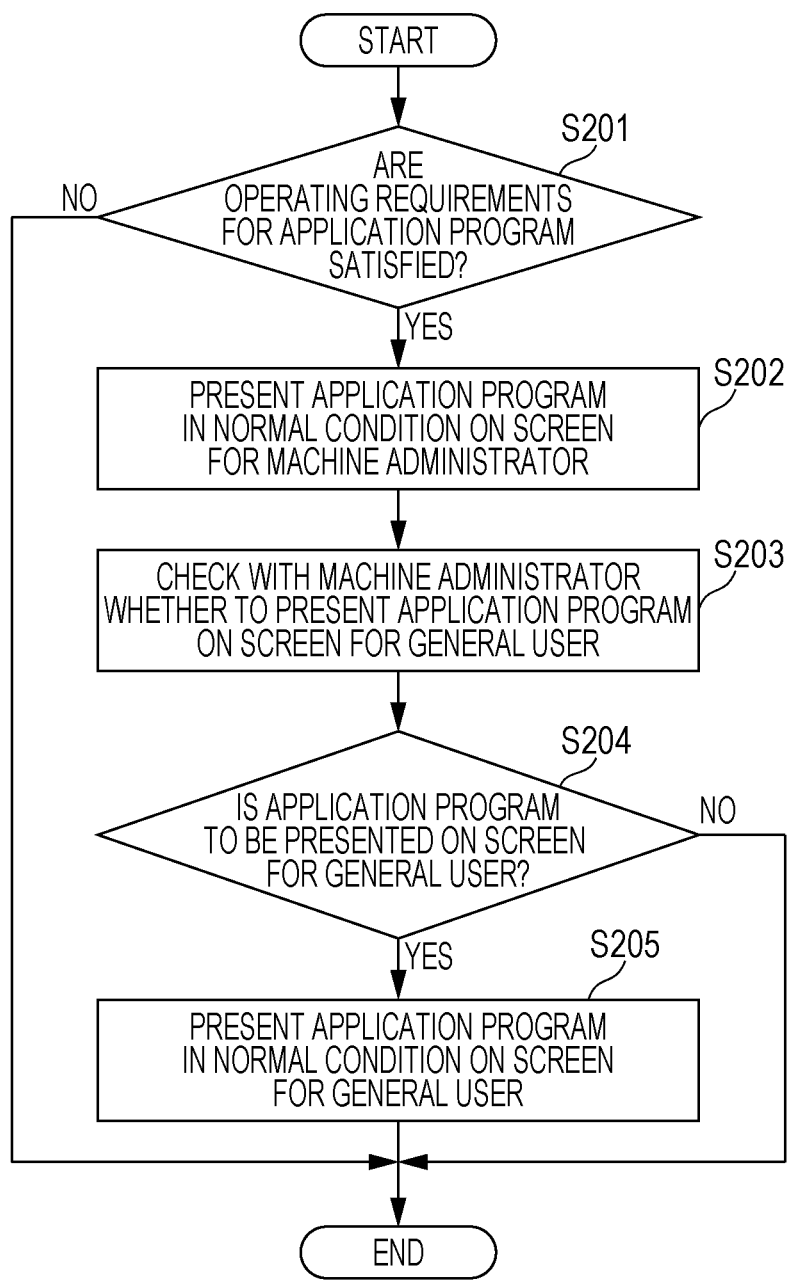
FIG. 8 is a flowchart for describing an operation in which operating requirements for running an application program are satisfied as a follow-up and thereafter the machine administrator launches the application program.

Next, referring to the flowchart in FIG. 8, a description will be given of an operation in which the machine administrator launches the application program after the operating requirements for running the application program are satisfied. The operating requirements are satisfied as a follow-up to the forcible installation of the application program described above.

In this description, it is assumed that the machine administrator fits the Fax option kit, which has arrived, to the image forming apparatus 10 and touches the icon representing the application program named "Customized Fax".

If the machine administrator commands in this way that the application program launch, the controller 35 determines in step S201 whether the operating requirements for the application program are satisfied.

If it is determined in step S201 that the operating requirements for the application program are satisfied, the controller 35 presents the icon of the application program in a normal condition on the screen for the machine administrator in step S202.

Figure 9:
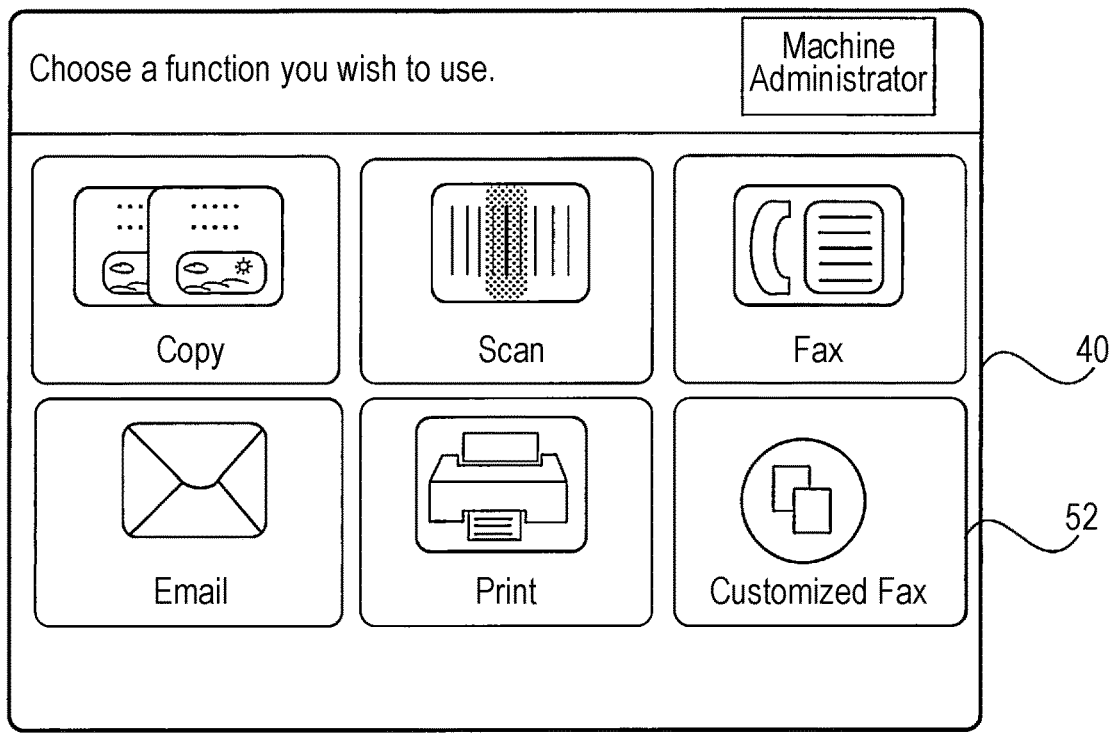
FIG. 9 is an illustration depicting an example of a home screen displayed on the operation panel in response to login by the machine administrator after operating requirements for running an application program are satisfied.

FIG. 9 depicts an example of a home screen displayed on the operation panel 40 in response to login by the machine administrator in such a situation. Referring to FIG. 9 reveals that an icon 52 representing "Customized Fax" is presented in a normal condition since the operating requirements for the application program are satisfied whereas before the operating requirements are satisfied, the icon 51 is presented with the forbidden mark attached, which indicates that the application program does not run.

Then, in step S203, the controller 35 checks with the machine administrator whether to present the icon also on the screen for a general user.

If in step S204, the machine administrator chooses to present the icon also on the screen for a general user, the controller 35 presents in a normal condition an icon to launch the application program also on the screen for a general user in step 205.

Figure 10:
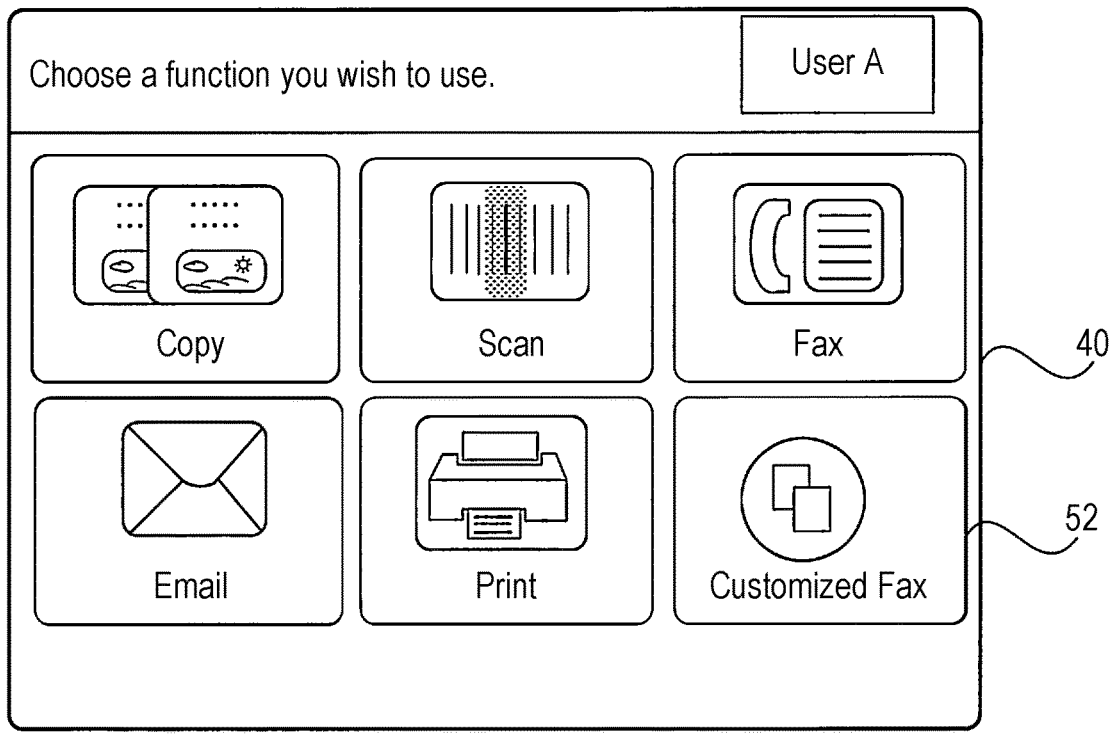
FIG. 10 is an illustration depicting an example of a home screen displayed on the operation panel in response to login by a general user after operating requirements for running an application program are satisfied.

FIG. 10 depicts an example of a home screen displayed on the operation panel 40 in response to login by a general user in such a situation. Referring to FIG. 10 reveals that the icon 52 representing "Customized Fax" is presented in a normal condition since the operating requirements for the application program are satisfied whereas before the operating requirements are satisfied, no icon related to "Customized Fax" is presented whatsoever.

If an icon is presented on the screen for the machine administrator to represent an application program that has been installed in a condition in which at least one operating requirement is not satisfied, the icon may be presented not only to indicate that the application program does not run but also to reveal a software or hardware resource required for running the application program.

For example, the icon may be presented with such a message as "Since the Fax option kit is not fitted, the application program does not run."

Further, in the above exemplary embodiment, a description has been given of a case where no icon representing an application program for which at least one operating requirement is not satisfied is presented whatsoever on the home screen displayed in response to login by a general user. However, under circumstances in which the image forming apparatus 10 is installed, a general user also understands to some extent the apparatus including its mechanism and structure, and the difference between the machine administrator and a general user is sometimes small.

Thus, an icon representing an application program for which at least one operating requirement is not satisfied may also be presented on the home screen displayed in response to login by a general user in such a manner as reveals that the application program does not properly run at this time.

Figure 11:
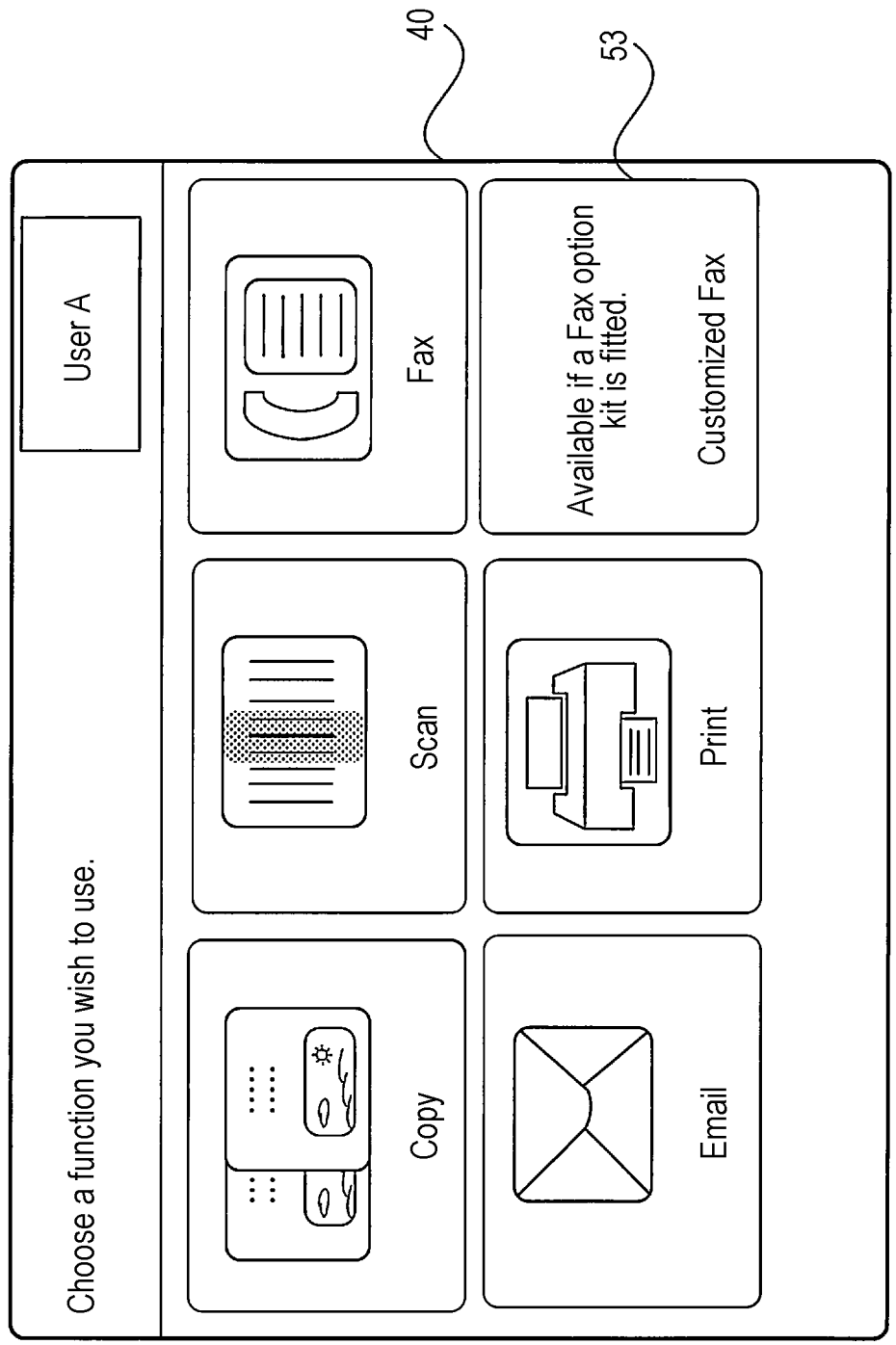
FIG. 11 is an illustration depicting an example of an icon representing an application program, the icon being presented on a home screen displayed in response to login by a general user, in a situation where at least one operating requirement for the application program is not satisfied.
Figure 12:
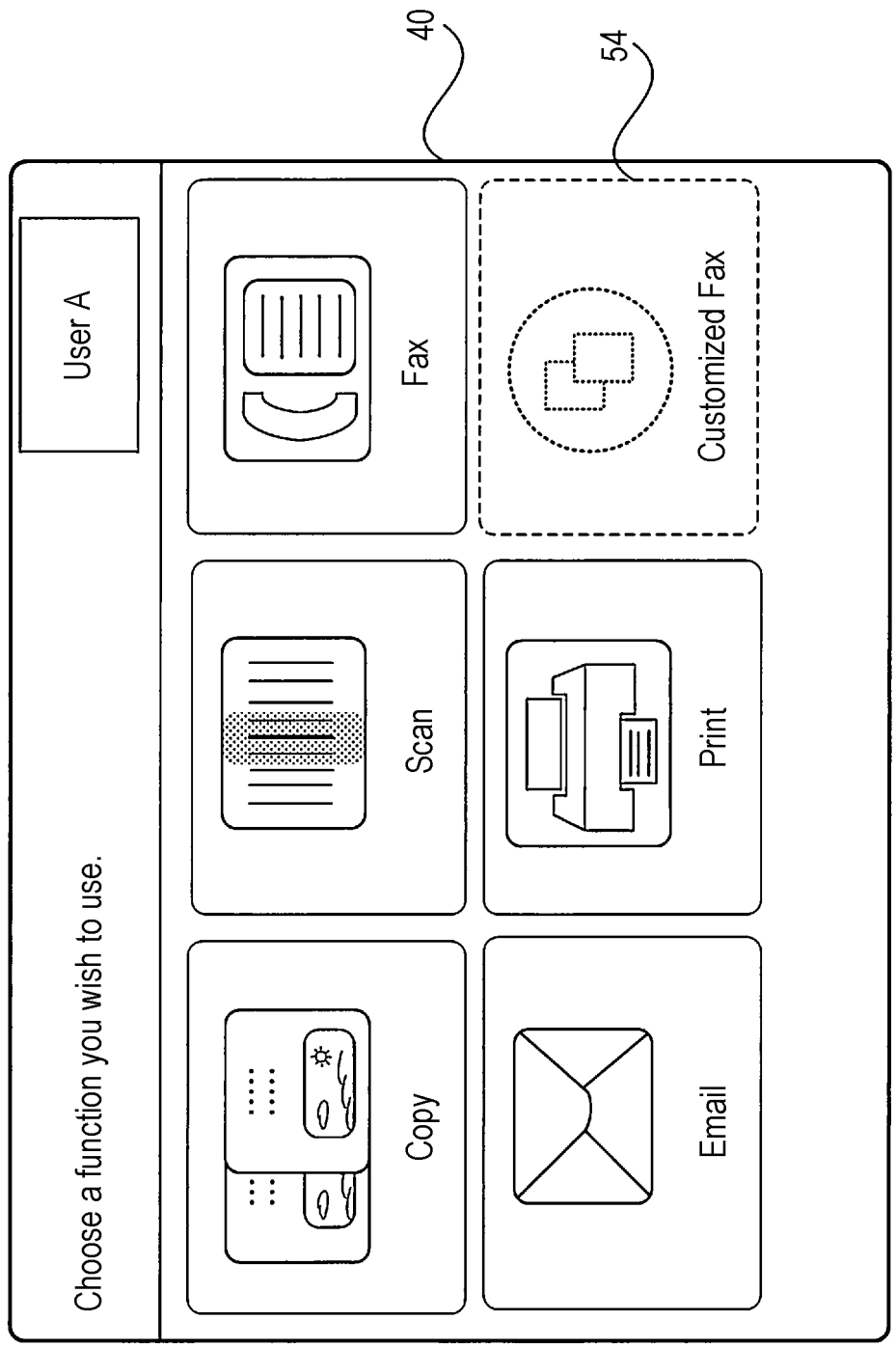
FIG. 12 is an illustration depicting another example of an icon representing an application program, the icon being presented on a home screen displayed in response to login by a general user, in a situation where at least one operating requirement for the application program is not satisfied.

FIGS. 11 and 12 each depict an example of an icon representing an application program, the icon being presented in this way on a home screen displayed in response to login by a general user, in a situation where at least one operating requirement for the application program is not satisfied.

In FIG. 11, an icon 53 representing "Customized Fax" is presented together with a message "Available if a Fax option kit is fitted." A general user, who views the presentation, can grasp the fact that the application program named "Customized Fax" does not run if launched since the Fax option kit is not fitted at this time.

In addition, in FIG. 12, an icon 54 representing "Customized Fax" is presented in a lower density than normal. A general user, who looks at the icon 54 having a lower density, can grasp the fact that the application program named "Customized Fax" does not run yet if launched.

The icons 53 and 54 depicted in FIGS. 11 and 12 may be presented on the screen displayed in response to login by the machine administrator.

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

Modification

In the above exemplary embodiment, the case where the application program is installed onto the image forming apparatus has been described, but the present disclosure is not limited to the above exemplary embodiment. The present disclosure can also be similarly applied in a case where the application program is installed onto an information processing apparatus other than an image forming apparatus, such as a personal computer or a smartphone.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory; and
a processor configured to
allow software to be installed onto the information processing apparatus even if a requirement is determined to be unsatisfied, the requirement being defined for the software to run after installation of the software, wherein the software is installed to be operable without further installation after the requirement is satisfied, and
cause a user interface of the information processing apparatus to indicate that the software that has been installed is unavailable by
concealing that the software has been installed from a general user other than a user who has administrator rights, and
displaying that the software has been installed but is inoperable to the user who has administrator rights.

2. The information processing apparatus according to claim 1,
wherein the processor is configured to cause the user interface of the information processing apparatus to reveal a software or hardware resource required for running the software.

3. The information processing apparatus according to claim 1,
wherein if a software or hardware resource of the information processing apparatus is modified and the requirement defined to run the software is satisfied, the processor is configured to cause the user interface of the information processing apparatus to indicate that the software is available.

4. The information processing apparatus according to claim 1,
wherein if a software or hardware resource of the information processing apparatus is modified and the requirement defined to run the software is satisfied, the processor reports to a predetermined destination that the software or hardware resource of the information processing apparatus is modified and the requirement defined to run the software is satisfied.

5. A non-transitory computer readable medium storing a program causing a computer to execute a process for information processing, the process comprising:
allowing software to be installed onto the computer even if a requirement is determined to be unsatisfied, the requirement being defined for the software to run after installation of the software, wherein the software is installed to be operable without further installation after the requirement is satisfied; and
causing a user interface of the computer to indicate that the software that has been installed is unavailable by
concealing that the software has been installed from a general user other than a user who has administrator rights, and
displaying that the software has been installed but is inoperable to the user who has administrator rights.

6. An information processing apparatus comprising:
a memory;
means for allowing software to be installed onto the information processing apparatus even if a requirement is determined to be unsatisfied, the requirement being defined for the software to run after installation of the software, wherein the software is installed to be operable without further installation after the requirement is satisfied; and
means for causing a user interface of the information processing apparatus to indicate that the software that has been installed is unavailable by
concealing that the software has been installed from a general user other than a user who has administrator rights, and
displaying that the software has been installed but is inoperable to the user who has administrator rights.

* * * * *